United States Patent
Barber et al.

(10) Patent No.: US 12,147,415 B2
(45) Date of Patent: Nov. 19, 2024

(54) METHOD AND APPARATUS FOR VALIDATING DATA IMAGES

(71) Applicant: Dell Products L.P., Round Rock, TX (US)

(72) Inventors: Michael Barber, Pearland, TX (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/159,837

(22) Filed: Jan. 26, 2023

(65) Prior Publication Data
US 2024/0256519 A1    Aug. 1, 2024

(51) Int. Cl.
*G06F 16/20* (2019.01)
*G06F 16/23* (2019.01)

(52) U.S. Cl.
CPC ...... *G06F 16/2365* (2019.01); *G06F 16/2379* (2019.01)

(58) Field of Classification Search
CPC .......................... G06F 16/2365; G06F 16/2379
See application file for complete search history.

(56) References Cited

U.S. PATENT DOCUMENTS

| | | | | |
|---|---|---|---|---|
| 5,590,318 A * | 12/1996 | Zbikowski | ......... | G06F 11/1469 |
| | | | | 714/E11.122 |
| 9,501,486 B1 * | 11/2016 | Thiam | ................. | G06F 11/1469 |
| 11,249,866 B1 * | 2/2022 | Budovski | .............. | G06F 16/128 |
| 2006/0224636 A1 * | 10/2006 | Kathuria | ............. | G06F 11/1471 |
| 2007/0294231 A1 * | 12/2007 | Kaihotsu | ................. | G06F 16/70 |
| 2014/0081933 A1 * | 3/2014 | Uhrhane | ............. | G06F 16/1873 |
| | | | | 707/695 |
| 2018/0196821 A1 * | 7/2018 | Kottomtharayil | ... | G06F 11/1448 |
| 2019/0138620 A1 * | 5/2019 | Avery | ................. | G06F 16/1844 |
| 2020/0210100 A1 * | 7/2020 | Li | .......................... | G06F 3/0656 |
| 2020/0311025 A1 * | 10/2020 | Singh | .................. | G06F 11/1004 |
| 2021/0271405 A1 * | 9/2021 | Yan | ....................... | G06F 3/0604 |

\* cited by examiner

*Primary Examiner* — Mahesh H Dwivedi
(74) *Attorney, Agent, or Firm* — Daly, Crowley, Mofford & Durkee, LLP

(57) ABSTRACT

A method, including: generating a layout plan that is associated with a dataset; obtaining a data record that is part of the dataset; assigning a serial number to the data record; storing the data record at a record storage location, the record storage location being selected based on the layout plan and the serial number that is assigned to the data record; generating a metadata record that corresponds to the data record, the metadata record including at least one of the serial number and an indication of the record storage location; storing the metadata record at a metadata storage location; generating a data image of a range of data storage locations, the range including the data storage location where the data record is stored; detecting whether the data image is corrupt based, at least in part, on the metadata record; and generating a diagnostic message.

20 Claims, 6 Drawing Sheets

METHOD AND APPARATUS FOR VALIDATING DATA IMAGES

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: generating a layout plan that is associated with a dataset; obtaining a data record that is part of the dataset; assigning a serial number to the data record; storing the data record at a record storage location, the record storage location being selected based on the layout plan and the serial number that is assigned to the data record; generating a metadata record that corresponds to the data record, the metadata record including at least one of the serial number and an indication of the record storage location; storing the metadata record at a metadata storage location; generating a data image of a range of data storage locations, the range including the data storage location where the data record is stored; detecting whether the data image is corrupt based, at least in part, on the metadata record; and generating a diagnostic message when the data image is corrupt.

According to aspects of the disclosure, a system is provided, comprising: a memory; and at least one processor operatively coupled to the memory, the at least one processor being configured to perform the operations of: generating a layout plan that is associated with a dataset; obtaining a data record that is part of the dataset; assigning a serial number to the data record; storing the data record at a record storage location, the record storage location being selected based on the layout plan and the serial number that is assigned to the data record; generating a metadata record that corresponds to the data record, the metadata record including at least one of the serial number and an indication of the record storage location; storing the metadata record at a metadata storage location; generating a data image of a range of data storage locations, the range including the data storage location where the data record is stored; detecting whether the data image is corrupt based, at least in part, on the metadata record; and generating a diagnostic message when the data image is corrupt.

According to aspects of the disclosure, a non-transitory computer-readable storage medium is provided that stores one or more processor-executable instructions, which, when executed by at least one processor, cause the at least one processor to perform the operations of: generating a layout plan that is associated with a dataset; obtaining a data record that is part of the dataset; assigning a serial number to the data record; storing the data record at a record storage location, the record storage location being selected based on the layout plan and the serial number that is assigned to the data record; generating a metadata record that corresponds to the data record, the metadata record including at least one of the serial number and an indication of the record storage location; storing the metadata record at a metadata storage location; generating a data image of a range of data storage locations, the range including the data storage location where the data record is stored; detecting whether the data image is corrupt based, at least in part, on the metadata record; and generating a diagnostic message when the data image is corrupt.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
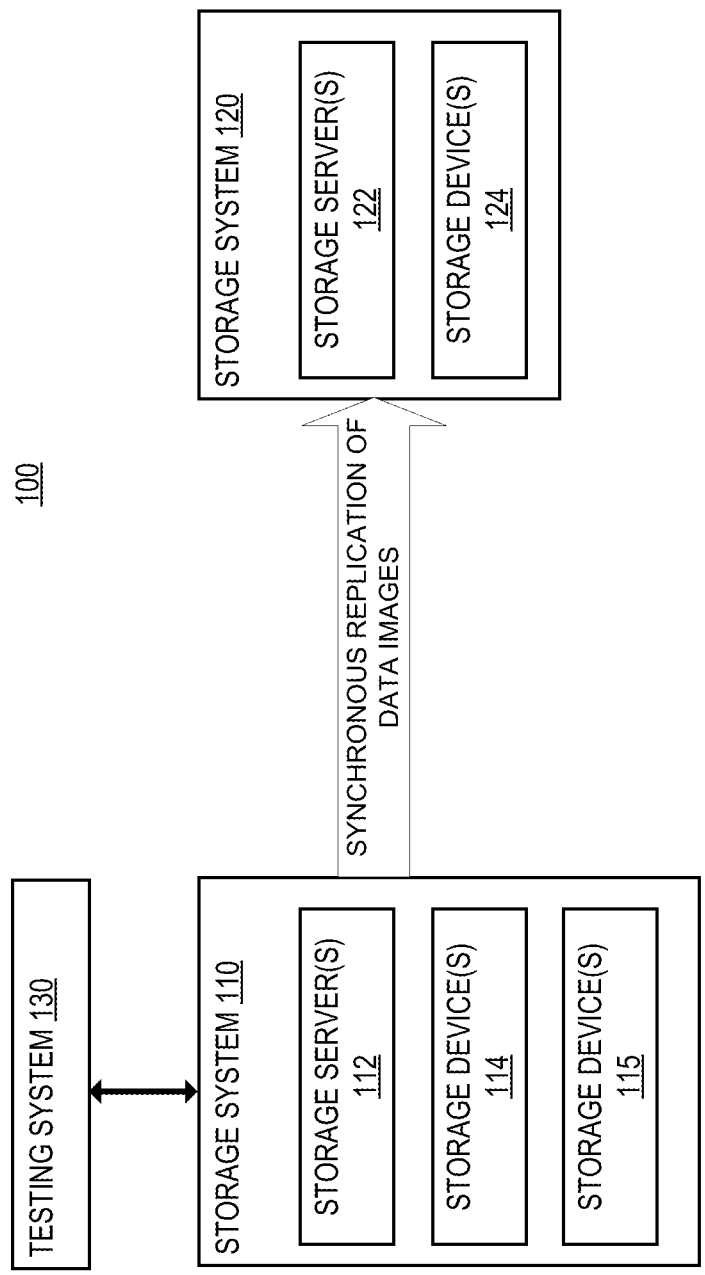
FIG. 1 is a diagram of an example of a system, according to aspects of the disclosure.

FIG. 1 is a diagram of an example of a system 100, according to aspects of the disclosure. As illustrated, the system 100 may include a storage system 110, a storage system 120, and a testing system 130. The systems 110, 120, and 130 may be operatively coupled to one another via a communications network (not shown). The communications network may include one or more of the Internet, a local area network (LAN), a wide area network (WAN), and/or another suitable type of network.

The storage system 110 may include a plurality of storage servers 112, a plurality of storage devices 114, and a plurality of storage devices 115. Each of the storage servers 112 may include a computing device, such as the computing device 600, which is discussed further below with respect to FIG. 6. Each of the storage devices 114 may include one or more of a solid-state drive (SSD), a hard disk (HD), a non-volatile random-access memory (NVRam) device, a non-volatile memory express (NVMe) device, and/or any other suitable type of storage device. Each of the storage devices 115 may include one or more of a solid-state drive (SSD), a hard disk (HD), a non-volatile random-access memory (NVRam) device, a non-volatile memory express (NVMe) device, and/or any other suitable type of storage device.

The storage system 120 may include a plurality of storage servers 122 and a plurality of storage devices 124. Each of the storage servers 122 may include a computing device, such as the computing device 600, which is discussed further below with respect to FIG. 6. Each of the storage devices 124 may include one or more of a solid-state drive (SSD), a hard disk (HD), a non-volatile random-access memory (NVRam) device, a non-volatile memory express (NVMe) device, and/or any other suitable type of storage device.

The testing system 130 may include a laptop computer, a desktop computer, and/or any other suitable type of computing device. In some implementations, the testing system 130 may be the same or similar to the computing device 600 which is discussed further below with respect to FIG. 6.

Figure 2:
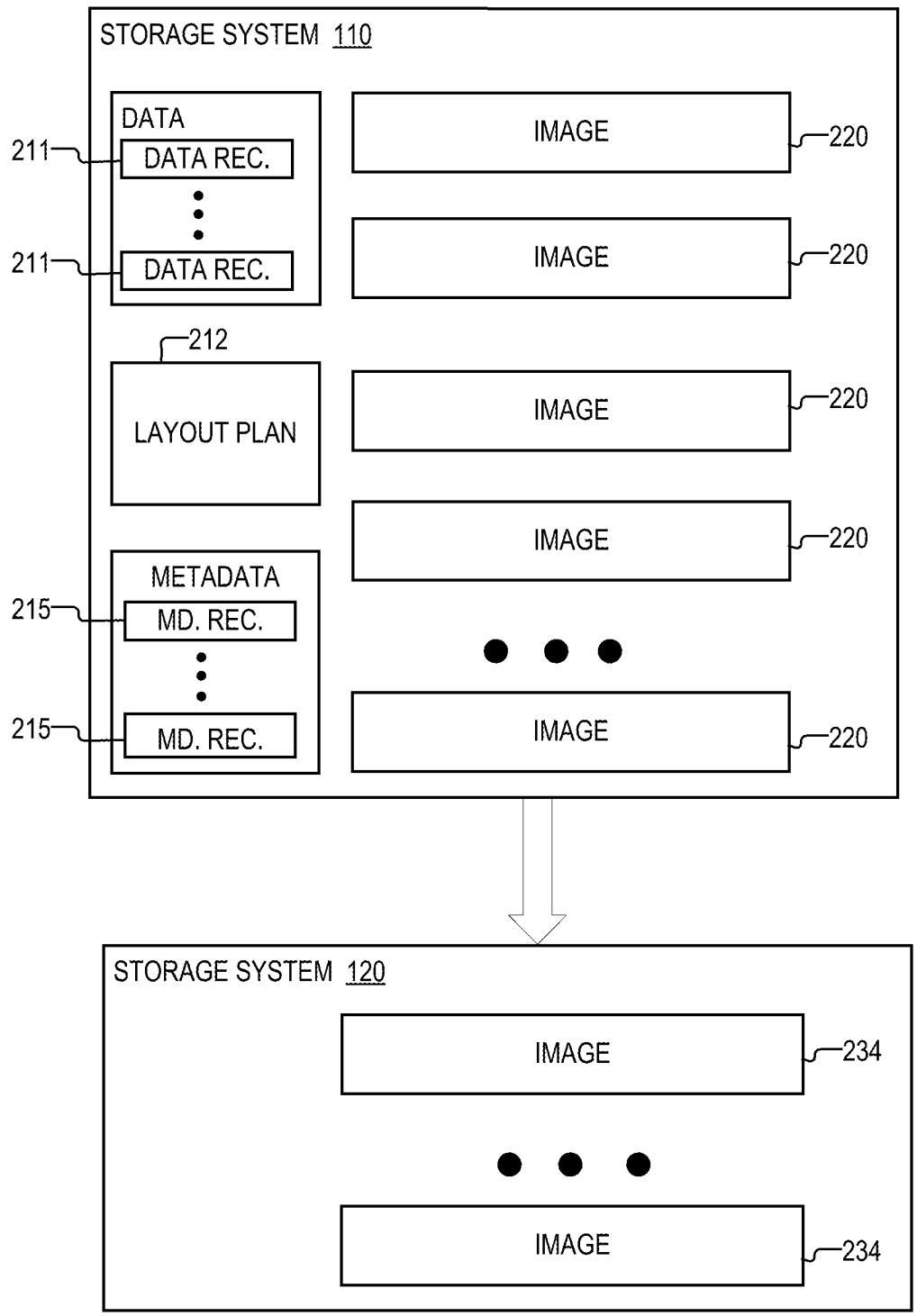
FIG. 2 is a diagram illustrating aspects of the operation of the system of FIG. 1, according to aspects of the disclosure.

FIG. 2 is a diagram illustrating aspects of the operation of the storage systems 110 and 120, in accordance with one example. In the example of FIG. 2, the data records 211 are stored in storage devices 114 for the purpose of testing the storage system 110. At any given time, a predetermined number (e.g., recnum) of data records may be stored in the storage system 110 (or storage devices 114). The data records 211 may be part of a test dataset. The test dataset may include all data records 211 that are stored in the storage system 110 during a particular test run. As new data records 211 are being stored in the storage system 110, they may overwrite other data records that have been stored previously, during the same test run. In this regard, recnum may be smaller than the size of the test dataset.

As the data records 211 are being written, the storage system 110 may periodically create images 220 of the storage devices 114 and store the images 220 in the storage devices 115. Each of the images 220 may be a snapshot of the storage devices 114. Each of the images 220 may be stored in the storage devices 115. Each of the images 220 may be generated without quiescing I/O in the storage system. In other words, the images 220 may be generated while new data records 211 are being written to the storage system 110 at the same time. In the present example, the images 220 are snapshots that are generated in response to point-in-time (PiT) events, however alternative implementations are possible in which any of the images 220 is any other suitable type of image (e.g., a remote replication image, etc.).

Each of the data records 211 may be associated with a corresponding metadata record 215. The contents of the data records 211 and metadata records 215 is discussed further below with respect to FIG. 3. The layout plan 212 may include one or more data structures that store one or more of the parameters of a particular test run. The contents of the layout plan 212 is discussed further below with respect to FIG. 3. Although in the present example the layout plan 212 and the metadata records 215 are stored in the memory of the storage system 110, alternative implementations are possible in which they are stored in the memory of another device (e.g., the testing system 130).

The images 234 may be stored in the storage devices 124 of the storage system 120. Each of the images 234 may be a copy of a different one of the images 220. In some implementations, each of the images 220 may be generated by using a synchronous or asynchronous replication process.

Figure 3:
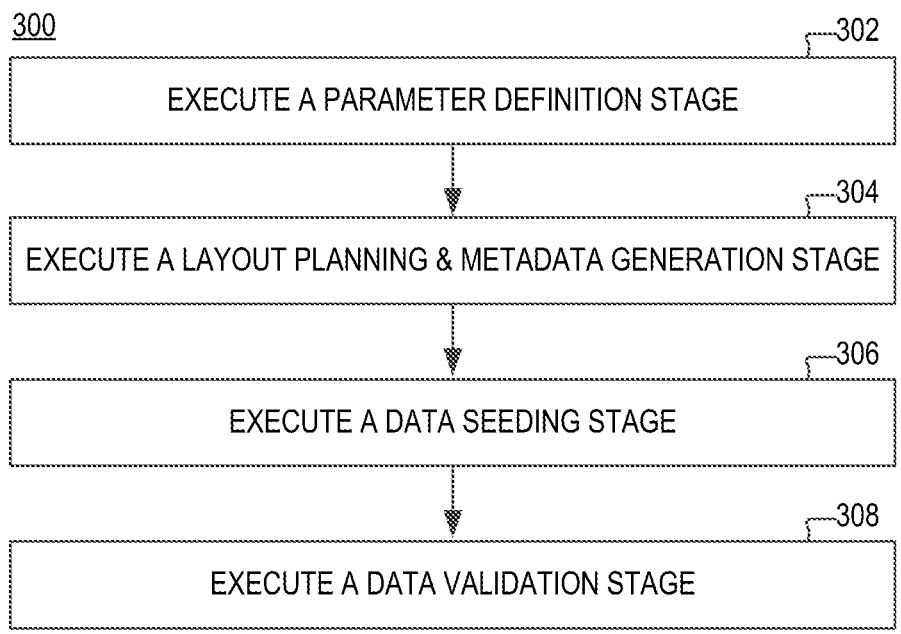
FIG. 3 is a flowchart of an example of a process, according to aspects of the disclosure.

FIG. 3 is a flowchart of an example of a process 300 for executing a test run, according to aspects of the disclosure. The test is performed to detect whether the storage system 110 is capable of generating crash-consistent images of the storage devices 114 (or a volume on the storage devices 114). In addition, the test may be performed for the purpose of detecting whether the storage system 110 contains any bugs that would cause the images 220 and/or 234 to be corrupted. At step 302, a parameter definition step is executed. At step 304, a layout planning and metadata generation stage is executed. At step 306, a data seeding stage is executed. And at step 308, a data validation stage is executed. Under the nomenclature of the present disclosure, the execution of the process 300 constitutes a single test run. Each of steps 302-308 is now described in additional detail.

Step 302: Parameter Definition Stage

At step 302, the user may input into the device executing the process 300 a plurality of parameters for the test run. The parameters for the test that are provided by the user at step 302 may include one or more of: (i) a list of identifiers of storage devices (e.g., storage devices 114) where the data records 211 are going to be written, (ii) one or more record sizes for the data records 211, and (iii) a target capacity—i.e., a size for the storage space where the data records 211 are going to be stored, and/or (iv) the number of data records 211 in the test dataset. Throughout the disclosure, the terms "parameter" and "field" are used interchangeably when permitted by context.

In some implementations, one or more of the following parameters are defined. In some implementations, at least some of the following parameters may be generated based on the user input—i.e., they may be provided as part of the user input or derived from the user input. Each of the parameters may be inserted in the layout plan 212, which is discussed above with respect to FIG. 2. In some implementations, the layout plan 212 may include one or more data structures that include any of the parameters discussed below. In this regard, at a minimum, the phrase "generating a layout plan" may include storing the key parameter (discussed below) at a particular memory location from where it can be copied into subsequent data records 211.

n_records: This parameter may be the primary means to control scale by defining the number of data records 211 in the test dataset. The number of records 211 tested may be chosen according to testing scale: small scale will use tens of thousands of records 211, and larger scale tests could involve millions or billions of records 211. Parameter n_records can be received as user input or calculated from a target dataset capacity.—8k, 16k. When calculating n_records from target dataset capacity, the user can provide a percentage of capacity to use, such as 50%, which would calculate n_records such that the total of utilized capacity will equal 50% of the raw disk capacity provided by the user.

n_devs: This parameter may identify the number of storage devices provided by the user which will be used to store data records 211. In other words, this is the count of storage devices where the data records 211 will be written over the course of the test run. In the present example, the storage devices are the storage devices 114 (i.e., hardware storage devices). However, the storage devices could also be data files inside a filesystem.

recsize: This parameter may be a single number identifying the desired length of individual records 211 in the test dataset, or for mixed sizes a list of record lengths (for records 211) with associated weights to control the size distribution. When mixed sizes are used for the records 211, the size of each record 211 may be chosen using a pseudorandom algorithm. Each of the weights may correspond to a different size and it may be used to control the probability of the corresponding weight size being selected by the pseudorandom algorithm.

key: A randomly generated number which will be used to identify data generated by this run of the test. The randomness should be sufficient to ensure back-to-back runs would be unlikely to generate the same key. The key value will be included in all records 211 that are written to the storage system 110. The key may provide an easy way to differentiate data related to this test run from stale data which may be present on the storage device from an earlier run.

cp_interval: This parameter controls the frequency of checkpoint writes which are used to support checking datasets that are incompletely written. As used herein, the term "checkpoint write" refers to generating one of the images 220. In some implementations, cp_interval could be a hard-coded value, such as 65536 which would cause a checkpoint after every 65536 records 211 are written, or it could be dynamically scaled based on the number of records in the test dataset. For example, setting cp_interval to 1% of the n_records value would cause a checkpoint after every 1% of the dataset is written.

dev_index: This parameter may include one or more device indices. Each of the indices may correspond to a different one of the storage devices that are identified by the user (i.e., storage devices 114), where the records 211 would be stored over the test run. The provided storage devices may be enumerated from zero to n_devs−1. Because data checking of a replicated target of this dataset may be presented one or more times back to the same host, or to a different host, the data validation process will use this dev_index value found on each replication target storage device to maintain a persistent mapping between the metadata and storage devices as was used when writing the data originally.

In some implementations, each of the storage devices 114 may be configured to store the device index that has been allocated to this device. The indication may be written to a known reserved location on each storage device (ex: block 0) and can be regarded as device header information.

Each of the images 220 may be distributed across storage devices 115. In this regard, one storage device 115 may be arranged to store a portion of the image 220 that includes data stored in a first one of the storage devices 124, and another storage device 115 may be configured to store another portion of the image 220 that includes data stored on a second one of the storage devices 124. In other words, each of the storage devices 115 may be configured to store image data that corresponds to a different one of the storage devices 124. As is discussed further below, each of the storage devices 115 may also be configured to store the device header information of the storage device 124 whose data the storage device 115 is configured to store.

Step 304: Planning and Metadata Generation Stage

At step 304, a layout for the data records 211 is determined that matches the criteria of record size, number of records, and number of storage devices as provided by the user. As used herein, the phrase "planning a layout" refers to identifying the storage locations in the storage system 110 where individual data records 211 are going to be stored. For instance, planning the layout may include identifying a different respective storage location for each of the n_records that could be stored in the storage system 110 at any given time. Any layout strategy can be used. In some implementations, the layout pattern may be selectable by the user. For example, the user may select a specific layout pattern, such as random or sequential, and how to handle data layout on asymmetrically sized storage devices. When a sequential layout pattern is selected, the data records 211 may be stored in a contiguous range of addresses in each of storage devices 114. When a sequential layout pattern is selected, the data records 211 may be stored at randomly selected address in the storage devices 114. In some implementations, the data records 211 that are stored at any given time in the storage system 110, during the execution of the test run, may occupy less than the entire capacity of the storage devices 114. The only constraint when planning the layout is to not allow the placement of two records to overlap and exclude reserved locations of the storage devices used for metadata.

In addition, at step 304, a plurality of metadata records 215 is created. Each metadata record 215 may correspond to a different data record 211 that is in storage on the storage system 110. For example, if there would be at most 10 records 211 stored in the storage system 110 at any given time, 10 metadata records 215 may be created, irrespective of how many records 211 end up being written and over-written in the storage system 110 over the course of the test run. Each metadata record 215 may contain at least some of the following information:

recnum: This record number (recnum) parameter is the index value for the record. This parameter may be determined based on the equation of recnum=serial_number mod n_records. According to the present example, recnum may uniquely identify a record 211 among all records that are stored it in the storage system 110 at a particular time, while serial_number may uniquely identify a record 211 among all records 211 that have been stored in the storage system 110 at one time or another. Parameter serial_number is discussed further below with respect to step 306.

dev_index_ptr: This parameter identifies the dev_index of the storage device which will store the record 211 that corresponds to the metadata record 215.

offset: This parameter is the offset at which this record will be written on the associated storage device (i.e., the storage device identified by dev_index_ptr).

length: This parameter specifies the size of the record 211 (associated with the metadata record 215). It is not necessary to include this field if the implementation is only made to support one record size because the data written in step 302 will have this information. However, if supporting a mix of record sizes in the dataset the length selected for each record must be included in the metadata.

The metadata records 215 may be stored at a reserved location (ex: block 2) in the storage devices 114 or elsewhere. The metadata records 215 can be relatively small in size. In this regard, thousands of metadata records can be packed into a single buffer and a checksum generated of the packed records and stored in the buffer, and the key value determined in step 302 can be included in the metadata records. Using this approach, the packed metadata buffers can be written in a striped manner (across the storage devices 114) by using large block sequential I/O. This approach also adds minimal overhead to include checksums which can later be used during data validation to ensure the metadata has not been corrupted by the replication process. Once the metadata records have been persisted to stable storage, the setup process is complete. Because the header information written at step 302 and the metadata written at step 304 are present on the storage device being replicated, the data layout will be self-describing on any replicated images of the data.

Step 306: Data Seeding Stage

At step 306, data records 211 which comprise the test dataset are written to the storage devices selected at step 302 (i.e., storage devices 114). Write ordering may be ensured by using synchronous IO and disabling host buffering with each write being acknowledged as committed to stable storage prior to issuing the next dependent write. While these writes are in progress the data replication method/mode being tested (ex: Snap/Clone/RDF etc.) is used to create an image of the records 211 (e.g., create an image 220 of the storage devices 114 and/or an image of the storage locations where the records are being stored), without quiescing I/O on the storage devices 114.

Each record 211 may have three portions: a header, a payload, and a tail (or trailer). The record payload could contain a specific mixture of repeating patterns and random data to influence the compressibility of the data, but any method of populating the payload with data is permitted. The record header and tail may be redundant copies of the same information to allow for specific cases of torn page data corruption to be more accurately diagnosed during the validation process, rather than generically flagging bad data.

The record header may contain the following parameters:

serial_number: The serial_number parameter may start counting at zero and increment for every new record written.

timestamp: The timestamp parameter may be a high-resolution timestamp that is added to any record 211 just prior to the record 211 being written.

key: This parameter is the same as the key parameter determined at step 302. It will be recalled that the key serves as a unique identifier of the test dataset used during the current test run. The key parameter is provided in each record 211 so that a seemingly valid record can further be verified to have been written by the current test run, rather than stale data left on the storage devices from an earlier run.

payload_checksum: This parameter is the checksum for only the payload portion of the record, and it is included so that the data integrity of the payload can be validated.

header_checksum: This parameter is the header of the record. With this field set to zero, the checksum of the header portion of the record is computed, and its result set in this field. Later when validated, the field will again be set to zero before calculating a checksum for comparison.

The relationship between a records serial number and the metadata recnum is equal to (serial_number mod n_records). Once a recnum has been derived from the serial number, the device_index_ptr, offset, and length for this record can be obtained from the metadata record 215 that corresponds to the given record 211 (i.e., the metadata record 215 that bears the calculated recnum).

In other words, in one implementation, the system may instantiate a record 211, assign a serial_number to the record, calculate the recnum of the record based on the assigned serial_number, add a header and/or trailer to the record, identify a metadata record 215 that has the same recnum (or an identifier that otherwise matches the recnum), determine the length of the record payload from the identified metadata record, populate the payload of the record 211 with a data pattern that has the determined length, retrieve the storage location where the record 211 should be stored from the identified metadata record 215, and store the record 211 at this storage location.

If the serial_number is less than n_records, an active dataset of the test run is considered incomplete. The active dataset of the test run includes only data records 211 that are currently stored in the storage system 110 (and it excludes data records 211 that have been previously-stored and overwritten). The active dataset can still be validated, but the validation process will not find every possible record when checking the dataset. Especially for large datasets, the process may not read back every location which might hold a record in this incomplete case, so the process can use a checkpointing process to serve as a hint during data validation on roughly where the process was writing at the time when the generation of one of images 220 is triggered.

Based on the value of cp_interval determined at step 302, whenever serial_number mod cp_interval is zero and serial_number<n_records, a checkpoint write is performed. The checkpoint will write the serial number of the record last written to the storage device which was assigned device_index of 0 at a reserved location. The serial number would enable the device executing the process 300 to identify the last data record 211 that is written to the storage system 110 and stop retrieving records before n_records number of records has been retrieved from an image 220 (when the image 220 is being validated).

If the serial_number is greater than or equal to n_records, then the active dataset is considered complete, and all records written will overwrite a previously written record. Because the dataset has been completely written at least once, there is no need to do checkpoint writes as the validation process will need to read everything. The number of record overwrite cycles can be determined according to the equation of cycle=floor(serial_number/n_records).

In some implementations, writing any of the data records 211 may include one or more of: (i) assigning a serial_number to the data record, (ii) calculating a recnum of the data record based on the assigned serial_number, (iii) identifying a metadata record 215 that has the same recnum, (iv) retrieving an indication of a storage location from the identified metadata record 215, (v) storing the data record at the retrieved storage location, and (vi) updating the metadata record 215 to include an indication of the serial_number of the data record 211.

The "data seeding" that is performed at step 306 can continue indefinitely in a loop without any sort of coordination with the creation of the images 220. Any of the created images 220 should be crash consistent, regardless of whether a record update was in-flight at the time of image activation.

Step 308: Execute a Data Validation Stage

At step 308, a respective image 220 of the data written at step 306 is validated. According to the present example, the respective image is written and retrieved from storage devices 115. According to the present example, the respective image is an image of the storage devices 124 (and/or a portion of the storage devices 124 where the data records 211, metadata records 215, and any other information associated with the test run is stored). The data is self-describing, so image validation only requires access to a set of storage devices 115 where the respective image is written.

In some implementations, validating an image may include one or more of: (i) retrieving the metadata records 215, (ii) retrieving the storage location of each of the data records 211 from on the metadata record 215 that has the same recnum as the data record, (iii) retrieving the data records from the image 202 based on the retrieved storage locations, and (iv) performing one or more of the checks discussed below on the retrieved data records 211. In some implementations, the data records may occupy a small portion of the image 202. In this regard, using the metadata records 215 is advantageous because it allows for the data records 215 to be located within the image, while at the same time allowing for large data images to be tested.

More particularly, in some implementations, the validation process may first read the header information from each storage device, verifying all share the same key value, and confirming the device_index values are all found from 0 to n_devs-1. Because the data validation may be on a different host or set of physical devices than were originally used to write the data, the ordering of the storage devices may have changed. By sorting the provided storage devices back into the order based on their device_index values, each storage device may then be ordered in a manner that is consistent with the layout information in the metadata.

At the beginning of the image validation, the integrity of all (or some) metadata information (i.e., the metadata records 215) is first checked. Specifically, the metadata information may be read back, confirming that each buffer of packed metadata records has a checksum that matches the value calculated at step 302 when the metadata was originally written. Next, the metadata records 215 are referenced to determine where each of the data records 211 in the image 220 can be found. Next, each of the data records 211 in the image 220 is retrieved from the image 220 (based on the information obtained from the metadata records 215).

In the case of a partially written dataset, the most recent checkpoint can be used to eliminate most unnecessary I/O which would be used to check the range of records that had not yet been written at the time of the replicated image. The serial number written in the most recent checkpoint on device_index 0 is read to determine if a full pass was completed at the time image was generated. If the serial number from the last checkpoint+cp_interval<(n_records−1), then the validation process would need to read back the records corresponding to recnum 0 through maxint (checkpoint+cp_interval, n_records−1), with tolerance for a contiguous range of some types of invalid records in only those last cp_interval records of the range. This is because the image 220 may have been created at any time between the last checkpoint and when the next checkpoint would happen (checkpoint+cp_interval), so the process would not treat the records that had not been written yet as an error. Furthermore, special handling is needed for the case where checkpoint<(n_records−1) and (checkpoint+cp_interval)>(n_records−1) since that is on the full cycle boundary case.

In cases where a random layout pattern is used, reading each record 211 back in write-order for validation could be a very time-consuming process. To avoid this problem, the metadata records 215 can be sorted to be in sequential disk order (i.e., the order of the memory addresses where the metadata records 215 are stored) rather than random write order (i.e., the order in which the metadata records 215 are written). Then, from walking this sorted list the validation process can use large buffer sequential read to bulk-read the records 211 back from the image. Using this approach, it may be possible to read in tens or hundreds of records with a single physical read I/O.

As each data record 211 is read, one or more of the following checks may be performed on each individual data record 211.

Check #1: Header Checksum—This check involves extracting just the header from the record 211, copying and setting the header_checksum field to zero, and computing a checksum of the resulting header. Afterwards, the new checksum is compared to the original checksum. If they do not match, the header is found to be corrupt, and the same operation is completed on the trailer of the record 211, which has a redundant copy of the same header information. A failure of either checksum comparison indicates data corruption but examining both may add additional context to the nature of the miscompare.

If the header checksum check fails, a diagnostic message may be generated that is indicative of the failure. The diagnostic message may include an identifier (e.g., serial_number) of the record 211 that failed the check. Additionally or alternatively, the diagnostic message may contain an indication of the type of check that failed (e.g., header checksum check). Additionally or alternatively, the diagnostic message may include an indication of which one of the header and trailer of the record 211 has failed the checksum check. If the checksum does not match for both the header and trailer, the diagnostic message may include an indication to this effect.

Check #2: Key Verification—This check involves verifying whether the key in the header of the record 211 matches the key generated during step 302. It will be recalled that the key is a unique identifier of the current test run or the test dataset of which the record 211 is part. This same key would have been on every storage device header and every record. If the key does not match, but the header checksum check passed, then this record was generated by a different test run.

If the key verification check fails, a diagnostic message may be generated that is indicative of the failure. The diagnostic message may include an identifier (e.g., serial_number) of the record 211 that failed the check. Additionally or alternatively, the diagnostic message may contain an indication of the type of check that failed (e.g., key verification check).

Check #3: Torn Pages—This check involves detecting whether the serial_number in the header of the record 211 matches the serial_number in the trail of the same record 211. If the two do not match, there is a torn page miscompare. In some implementations, further checking may be performed to determine if both the head and tail data is from a valid record or contains NULL or unrecognizable data. For example, if a prior record was being overwritten with the record 211, but the write was only partially persisted to stable storage, then there would be a mismatch between the header and tail (or trailer) of the record 211 (because the tail would belong to the record that was being overwritten and the header would belong to the new record).

If the torn pages check fails, a diagnostic message may be generated that is indicative of the failure. The diagnostic message may include an identifier (e.g., serial_number) of the record 211 that failed the check. Additionally or alternatively, the diagnostic message may contain an indication of the type of check that failed (e.g., torn page check). Additionally or alternatively, the diagnostic message may include an indication of the state of the header and/or trailer data: the indication may indicate whether the head and/or tail data is from a valid record or contains NULL or unrecognizable data.

Check #4: Payload Corruption—The payload corruption check involves computing a checksum for the payload of the record 211 and comparing this to the computed checksum to the checksum in the header of the record 211. If the two checksums do not match, then data corruption is determined to have occurred. Based on earlier checking, the process may have already identified a torn page which will fail this check as well. However, if no torn page was detected, yet this check fails, then it can be determined that the data corruption has occurred somewhere inside the record 211. It may be easy to detect where the corruption is, if repeating data pattern is used for payload in the records 211 in the test dataset. However, if random data is used for the payload, it may not be clear exactly which bytes of the payload have been corrupted.

If the payload corruption check fails, a diagnostic message may be generated that is indicative of the failure. The diagnostic message may include an identifier (e.g., serial_number) of the record 211 that failed the check. Additionally or alternatively, the diagnostic message may contain an indication of the type of check that failed (e.g., payload corruption). Additionally or alternatively, the diagnostic message may include an indication of the portion in the payload that is corrupted—for example, the diagnostic message may indicate that bits 14 through 64 have been corrupted.

Check #5: Serial Number Mapping—This check involves retrieving the serial_number of the record 211 and verifying that the serial_number modulus n_records equals the recnum from the metadata record 215 that corresponds to the record 211 (i.e., the metadata record 215 that was used to locate this record). If the serial_number modulus n_records does not equal the recnum, then the record 211 was written to a different offset and somehow was moved or is being read from the wrong location.

If the payload corruption check fails, a diagnostic message may be generated that is indicative of the failure. The diagnostic message may include an identifier of the record 211 that failed the check. Additionally or alternatively, the diagnostic message may contain an indication of the type of check that failed (e.g., serial number mapping check).

Checks #1-5 are performed individually on each record 211 and serve to validate the data inside the record. However, the totality of the entire set of records that is retrieved from the image must also be examined to prove crash-consistency. There is no need to retain a full copy of the record in memory after it is validated so long as the validation process retains every record's serial_number and timestamp. Once the serial_number and timestamp fields have been collected from all records, the list should be sorted based on serial_number. The following checks are performed:

Check #6: Write Order Fidelity—The sorted list of serial numbers must be a contiguous range. If there are any skipped numbers in the list, then there are missing dependent writes. If the dataset was fully written, the difference between the maximum serial_number and minimum serial number must match n_records−1. In other words, the write order fidelity check includes detecting whether the image includes an interrupted sequence of records 211. For example, if the image includes serial records with serial numbers 1, 2, 3, 4, 6, and 7, the image may be said to include an interrupted sequence of records 211 because the record with serial number of '5' is missing.

If the write order fidelity check fails, a diagnostic message may be generated that is indicative of the failure. The diagnostic message may include an indication of the type of check that failed (e.g., write order fidelity check). Additionally or alternatively, the diagnostic message may include identifiers (e.g., the serial_number(s)) of one or more records 211 that are missing from the image.

In the case of an incompletely written dataset, the logic applied with the checkpoint and error tolerance may have confirmed a smaller number of records were written at the time of a replicated point-in-time image, so this validation step should be treated accordingly.

Check #7: Invalid Version—The write order fidelity check will identify most crash consistency problems. However, there may be some outlier cases of data corruption which require further analysis. For example, if a replicated point-in-time image was created, later restored back to the original source devices, and the current test run was executed in a mode to resume from where the previous writer left off, then some of the same serial numbers will be written (due to the restore reverting it to an earlier state). If corruption occurs where a record that should have been eliminated due to the restore option is found among the newly written records, all the previous checks will fail to spot the corruption since it is a valid record generated by this instance. To detect this case, the process may perform a walk through the ordered serial numbers and compare each timestamp to the previous records timestamp. If the timestamp ever goes backwards in time, this will be an indication that this case is present. This case only becomes possible when testing backup and recovery using replicated images, or when testing complex replication topologies where there could be two legitimate versions of the same record with the serial number written at two different times into different volumes within the same storage subsystem.

In other words, as noted above, the serial_number of a record 211 is equal to the recnum of the record modulus n_records. The parameter n_record specifies the total number of records 211 that can be stored before prior records 211 begin to be overwritten. The current test run may include multiple iterations, where in each iteration, an n_record number of records are written. When a restore is performed, and the current test run is resumed, one might end up with the following uninterrupted sequence of records having serial_number (or other identifiers) "1, 2, 3, 4, 5", where records {1, 2, 3} and {4, 5} belong to different iterations. This condition is detected by the invalid version check by examining the timestamps of the records to detect that the timestamps of records {4,5} are before the timestamps of records {1, 2, 3}.

If the invalid version check fails, a diagnostic message may be generated that is indicative of the failure. The diagnostic message may include an indication of the type of check that failed (e.g., invalid version check). Additionally or alternatively, the diagnostic message may include identifiers (e.g., the serial_number(s)) of one or more records 211 that are missing from the image.

If the invalid version check fails, a diagnostic message may be generated that is indicative of the failure. The diagnostic message may include an indication of the type of check that failed (e.g., write order fidelity check). Additionally or alternatively, the diagnostic message may include identifiers (e.g., the serial_number(s)) of one or more records 211 that are from a previous iteration.

If each of checks #6-7 is passed, the image 220 is assured to be crash consistent. To better mimic a real customer application, after the data has been validated, the process 300 could go back to step 306 (data seeding), but starting at previously discovered maximum value for serial_number+1 to continue writing new records where the previous writer left off. This allows the process 300 to resume writing on a replicated copy of the test data, continue writing after restoring to an earlier point-in-time image on the original set of storage device, or testing of complex replication topologies. If the process checks and resumes writing on a different storage system, it is necessary to synchronize their clocks such that their difference is less than the time it takes to stop writing on one host and continue writing on a different host.

Figure 4:
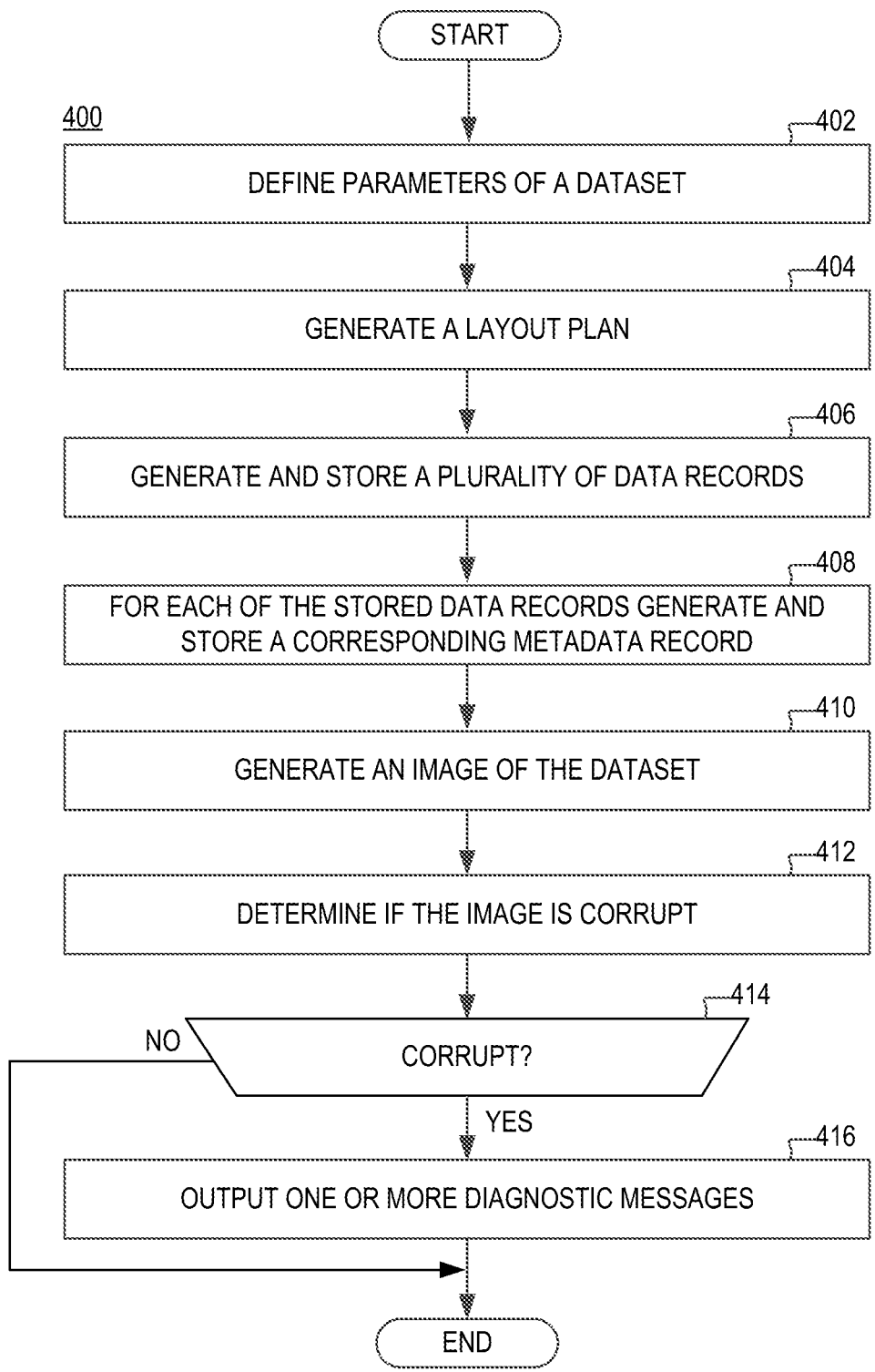
FIG. 4 is a flowchart of an example of a process, according to aspects of the disclosure.

FIG. 4 is a flowchart of an example of a process 400, according to aspects of the disclosure. At least some of the steps in the process 400 can be performed in a different order, performed concurrently, or altogether omitted.

At step 402, the parameters of a test dataset are defined. The parameters may include one or more of the parameters discussed above with respect to step 302 of the process 300.

At step 404, a layout plan is generated. In some implementations, the layout plan may be a data structure that includes one or more of the parameters defined at step 402.

At step 406, a plurality of data records is stored in the storage system 110. Each of the data records may be the same or similar to any of the data records 211, which are discussed above with respect to FIGS. 1-3.

At step 408, for each of the stored data records, a metadata record is generated and stored in the storage system 110. Each of the metadata records may be the same or similar to one of the metadata records 215, which are discussed above with respect to FIG. 2. Each of the metadata records may correspond to a different one of the data records (generated at step 406). Each of the metadata records may identify the location (e.g., one or more of a storage device, logical block address, and/or or physical block address, etc.) where the metadata record's corresponding data record is stored.

At step 410, an image of the storage locations where the data records are stored is created. The image may include a snapshot and/or any other suitable type of image. The image may be the same or similar to any of the images 220, which are discussed above with respect to FIGS. 1-3.

At step 412, a determination is made if the image is corrupt. In some implementations, detecting whether the image is corrupt may include performing one or more of the checks discussed above with respect to step 306. Specifically, detecting whether the image is corrupt may include: (i) retrieving the respective metadata record for each (or at least some) of the data records generated at step 406; (ii) identifying the storage location where each of the data records is stored based on the data record's corresponding metadata record; (iii) retrieving a plurality of data records, wherein in each of the records is retrieved from a different one of the identified storage locations; (iv) performing one or more of Checks #1-5 on each of the retrieved data records; (v) detecting that the image is corrupt if at least one of the checks is failed by at least one of the data records; (vi) performing one or more of Checks #6-7 on the entire set (plurality) of retrieved data records; (vii) detecting that the image is corrupt if any of Checks #6-7 is failed; and (viii) detecting that the image is not corrupt if none of the performed checks is failed.

At step 414, a determination is made if the image is found to be corrupt at step 412. If the image is found to be corrupt, the process 400 proceeds to step 416. Otherwise, the process 400 ends.

At step 416, one or more diagnostic messages are generated. The diagnostic messages may be the same or similar to one or more of the diagnostic messages discussed above with respect to step 308 of the process 300. Outputting any of the diagnostic messages may include storing the diagnostic message at a predetermined memory location, displaying the diagnostic message on a display screen, and/or transmitting the diagnostic message to a remote device.

Figure 5:
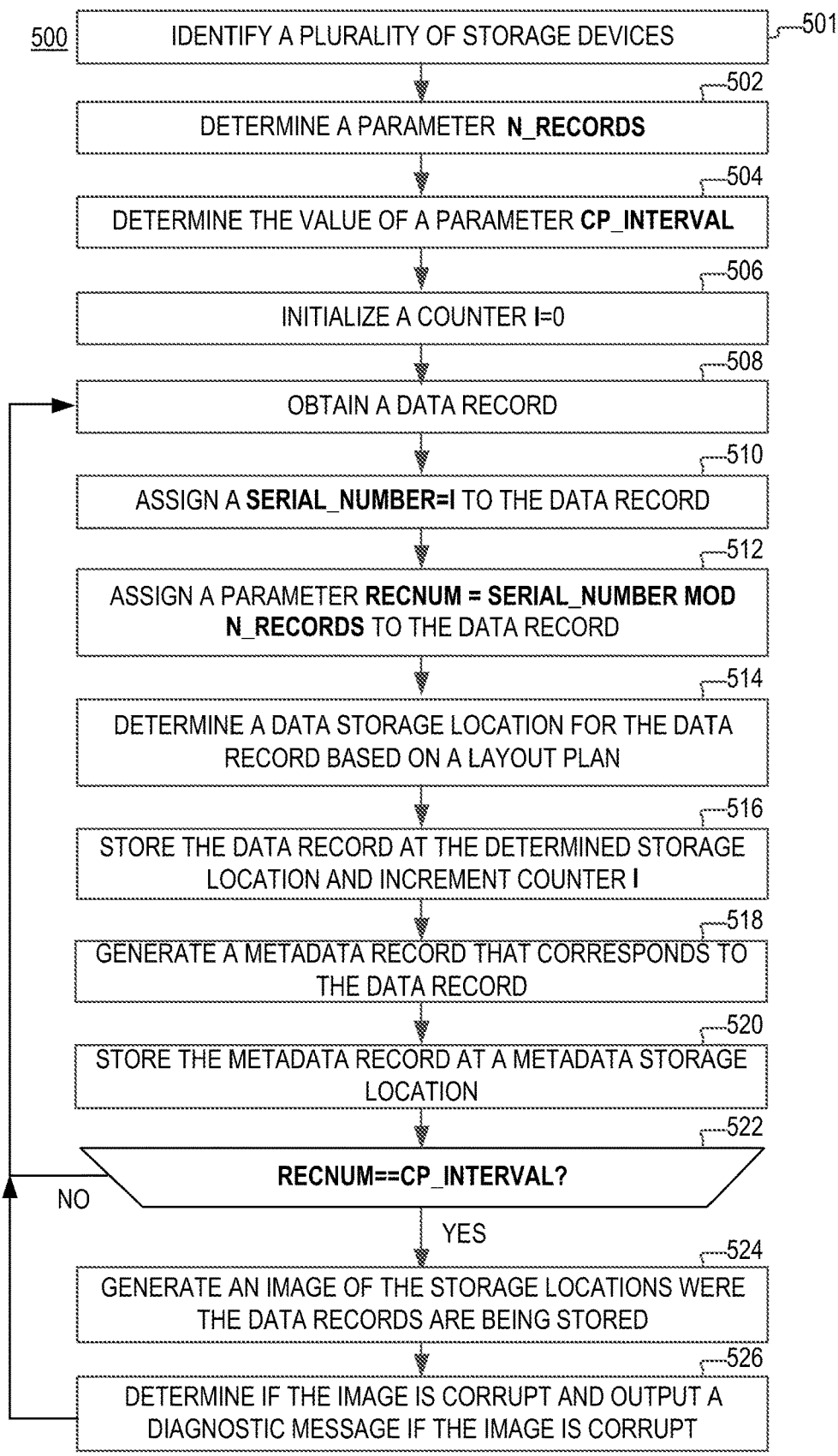
FIG. 5 is a flowchart of an example of a process, according to aspects of the disclosure.

FIG. 5 is a flowchart of an example of a process 500, according to aspects of the disclosure. At least some of the steps in the process 500 can be performed in a different order, performed concurrently, or altogether omitted.

At step 501, a plurality of storage devices is identified where records 211 are going to be stored (e.g., the storage devices 114, shown in FIG. 1).

At step 502, the value of a parameter n_records is identified. As discussed above, the parameter n_records identifies the total number of data records 211 that are going to be stored in the storage system 110 at any given time.

At step 504, the value of a parameter cp_interval is determined. The parameter cp_interval may identify the time when an image of the storage devices (or files) where the data records 211 are stored is going to be generated. In one example, parameter cp_interval may be equal to a positive integer X. In this example, parameter cp_interval may specify that the image is going to be generated every time X data records 211 have been stored in the storage system 110 since the most recent generation of an image of the storage devices (or files) where the data records 211 are being written.

At step 506, a counter i is initialized. Counter i identifies the total number of data records 211 that have been written to the storage system 110 (and perhaps subsequently overwritten by newer data records 211).

At step 508, a data record 211 is obtained (e.g., generated, retrieved from memory, etc.). The data record 211 may be obtained in the manner discussed above with respect to FIG. 3.

At step 510, a serial_number is assigned to the obtained data record 211. According to the present example, serial_number is set to equal the value of i.

At step 512, a parameter recnum is assigned to the obtained data record 211. According to the present example, recnum=serial_number mod n_records.

At step 514, a storage location (obtained at step 508) is identified where the data record 211 is going to be stored. In some implementations, identifying the storage location may include identifying a particular one of the plurality of storage devices (determined at step 501) where the data record 211 is going to be stored, and determining an offset (e.g., a logical block address, a physical address, etc.) within the storage device where the data record 211 is going to be stored.

At step 516, the data record is stored at the storage location (identified at step 514) and the counter i is incremented by 1.

At step 518, a metadata record 215 is generated that corresponds to the data record 211. In some implementations, the metadata record 215 may include any of the information that is discussed above records with respect to FIG. 3. In one example, the metadata record 215 may include the serial_number and/or recnum of the data record, as well as an indication of the storage.

At step 520, the metadata record is stored in the storage system 110.

At step 522, a determination is made if recnum (determined at step 512) is equal to cp_interval. If recnum==cp_interval, the process 500 proceeds to step 524. Otherwise, if recnum !=cp_interval, the process 500 returns to step 508, and another data record and metadata record are stored in the storage system 110. Although in the present example, the number of records written is used to trigger the generation of an image, alternative implementations are possible in which the generation of the image is triggered by the passage of time.

At step 524, an image of the storage locations where the data records are stored is generated. According to the present example, the image is an image 220 of the set of storage devices identified at step 501. However, alternative implementations are possible in which the image is an image of only a portion of the set of storage devices. The image may include some or all of the storage locations where the data records 211 during preceding iterations of steps 508-526.

At step 526, a determination is made if the image is corrupt, and one or more diagnostic messages are generated if the image is found to be corrupt. Step 526 may be executed in the manner discussed above with respect to steps 412 and 416 of the process 400. After step 526 is completed, the process 500 returns to step 508. The process 500 may terminate after a predetermined number of images have been generated and validated or when the counter i reaches a predetermined value.

Figure 6:
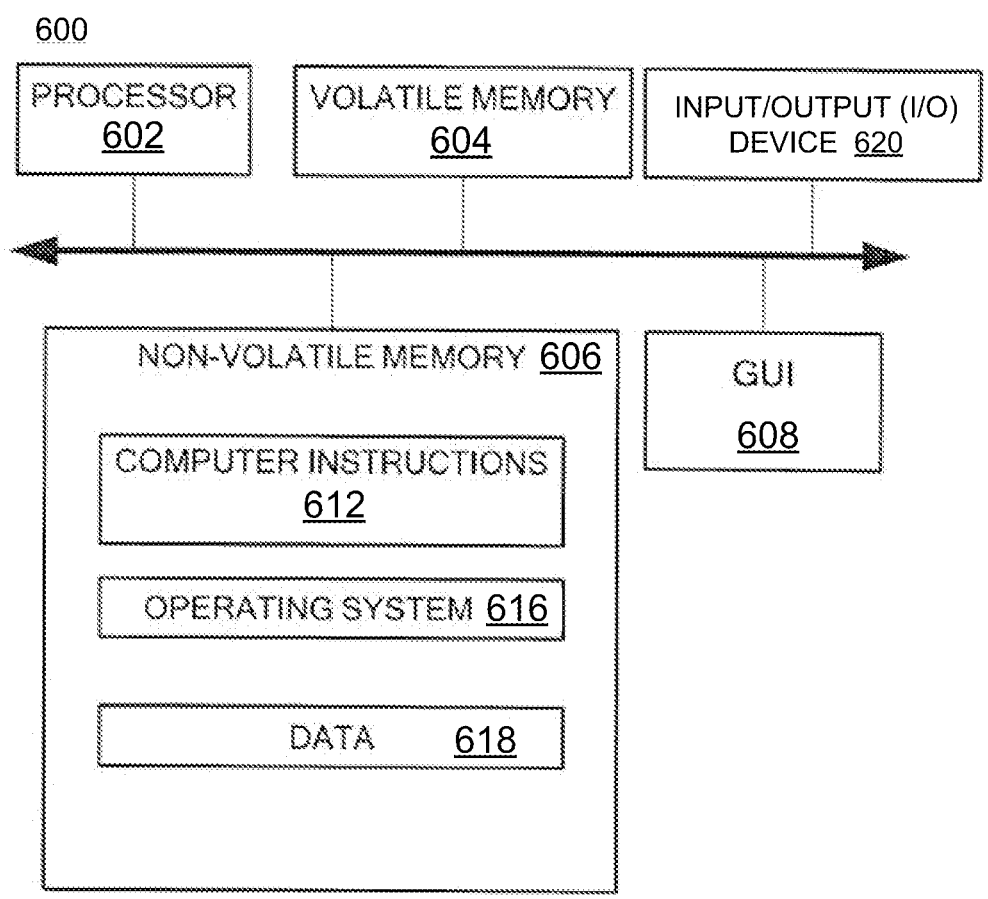
FIG. 6 is a diagram of an example of a computing device, according to aspects of the disclosure.

Referring to FIG. 6, in some embodiments, a computer 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. Any of the processes discussed above with respect to FIGS. 3-5 may be performed by testing system 130 and/or any other suitable type of computing device or devices. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   generating a layout plan that is associated with a dataset;
   obtaining a data record that is part of the dataset;
   assigning a serial number to the data record;
   storing the data record at a record storage location, the record storage location being selected based on the layout plan and the serial number that is assigned to the data record;
   generating a metadata record that corresponds to the data record, the metadata record including at least one of the serial number and an indication of the record storage location;
   storing the metadata record at a metadata storage location;
   generating a data image of a range of data storage locations, the range including the data storage location where the data record is stored;
   detecting whether the data image is corrupt based, at least in part, on the metadata record; and
   generating a diagnostic message when the data image is corrupt,
   wherein detecting whether the data image is corrupt includes detecting whether a timestamp of the data record is in a correct sequence with timestamps of other data records from the dataset that are stored in the data image.

2. The method of claim 1, wherein detecting whether the data image is corrupt includes detecting whether the data image is crash-consistent.

3. The method of claim 1, wherein detecting whether the data image is corrupt further includes:
   using the metadata record to identify the record storage location where the data record is stored,
   using the record storage location to retrieve, from the data image, data that corresponds to the record storage location; and
   using the serial number of the data record to determine whether the data image includes an uninterrupted sequence of data records that are associated with the dataset.

4. The method of claim 1, wherein detecting whether the data image is corrupt further includes:
   using the metadata record to identify the record storage location where the data record was stored,
   using the record storage location to retrieve, from the data image, data that is stored at the record storage location; and
   examining the data to determine if the data image is corrupt.

5. The method of claim 1, wherein the record storage location includes a storage location in a storage system, and the layout plan includes a data structure that contains a key identifying the layout plan, and an indication of a maximum number of records that can be stored in the storage system at any given time.

6. The method of claim 1, wherein the metadata record is generated before the data record, the method further comprising identifying the storage location for the data record, the identifying including retrieving the storage location from the metadata record.

7. The method of claim 1, further comprising adding at least one of the serial number that is assigned to the data record and a key identifying the layout plan to both a header and a tail of the data record, wherein detecting whether the data image is corrupt further includes detecting whether the header matches the tail.

8. The method of claim 1, wherein the data image includes a snapshot or remote replication image that is generated in response to a point-in-time (PiT) event, the method further comprising attaching, to the data record, the serial number that is assigned to the data record, a time stamp, a checksum, and a key identifying the layout plan.

9. A system, comprising:
   a memory; and
   at least one processor operatively coupled to the memory, the at least one processor being configured to perform the operations of:
   generating a layout plan that is associated with a dataset;
   obtaining a data record that is part of the dataset;
   assigning a serial number to the data record;
   storing the data record at a record storage location, the record storage location being selected based on the layout plan and the serial number that is assigned to the data record;
   generating a metadata record that corresponds to the data record, the metadata record including at least one of the serial number and an indication of the record storage location;
   storing the metadata record at a metadata storage location;
   generating a data image of a range of data storage locations, the range including the data storage location where the data record is stored;
   detecting whether the data image is corrupt based, at least in part, on the metadata record; and
   generating a diagnostic message when the data image is corrupt,
   wherein detecting whether the data image is corrupt includes detecting whether a timestamp of the data record is in a correct sequence with timestamps of other data records from the dataset that are stored in the data image.

10. The system of claim 9, wherein detecting whether the data image is corrupt includes detecting whether the data image is crash-consistent.

11. The system of claim 9, wherein detecting whether the data image is corrupt further includes:
    using the metadata record to identify the record storage location where the data record is stored, using the record storage location to retrieve, from the data image, data that corresponds to the record storage location; and using the serial number of the data record to determine whether the data image includes an uninterrupted sequence of data records that are associated with the dataset.

12. The system of claim 9, wherein detecting whether the data image is corrupt further includes:

using the metadata record to identify the record storage location where the data record was stored, using the record storage location to retrieve, from the data image, data that is stored at the record storage location; and examining the data to determine if the data image is corrupt.

13. The system of claim 9, wherein the layout plan includes a data structure that contains a key identifying the layout plan, and an indication of a maximum number of records that can be stored in the storage system at any given time.

14. The system of claim 9, wherein the metadata record is generated before the data record, and the at least one processor is further configured to perform the operation of identifying the storage location for the data record, the identifying including retrieving the storage location from the metadata record.

15. The system of claim 9, wherein:

the at least one processor is further configured to perform the operation of adding at least one of the serial number that is assigned to the data record and a key identifying the layout plan to both a header and a tail of the data record, and detecting whether the data image is corrupt further includes detecting whether the header matches the tail.

16. The system of claim 9, wherein the data image includes a snapshot or remote replication image that is generated in response to a point-in-time (PiT) event, the method further comprising attaching, to the data record, the serial number that is assigned to the data record, a time stamp, a checksum, and a key identifying the layout plan.

17. A method, comprising:

generating a layout plan that is associated with a dataset;

obtaining a data record that is part of the dataset;

assigning a serial number to the data record;

attaching, to the data record, the serial number that is assigned to the data record, a time stamp, a checksum, and a key identifying the layout plan;

storing the data record at a record storage location, the record storage location being selected based on the layout plan and the serial number that is assigned to the data record;

generating a metadata record that corresponds to the data record, the metadata record including at least one of the serial number and an indication of the record storage location:

storing the metadata record at a metadata storage location;

generating a data image of a range of data storage locations, the range including the data storage location where the data record is stored wherein the data image includes a snapshot or remote replication image that is generated in response to a point-in-time (PiT) event;

detecting whether the data image is corrupt based, at least in part, on the metadata record; and generating a diagnostic message when the data image is corrupt.

18. The method of claim 17, wherein detecting whether the data image is corrupt includes detecting whether the data image is crash-consistent.

19. The method of claim 17, wherein the record storage location includes a storage location in a storage system, and the layout plan includes a data structure that contains a key identifying the layout plan, and an indication of a maximum number of records that can be stored in the storage system at any given time.

20. The method of claim 17, wherein the metadata record is generated before the data record, the method further comprising identifying the storage location for the data record, the identifying including retrieving the storage location from the metadata record.

* * * * *